United States Patent
Vieira et al.

(10) Patent No.: US 7,813,653 B2
(45) Date of Patent: Oct. 12, 2010

(54) METHOD AND APPARATUS FOR REDUCING CLIPPING IN AN OPTICAL TRANSMITTER BY PHASE DECORRELATION

(75) Inventors: Amarildo C. Vieira, Philadelphia, PA (US); Mani Ramachandran, San Jose, CA (US)

(73) Assignee: General Instrument Corporation, Horsham, PA (US)

(*) Notice: Subject to any disclaimer, the term of this patent is extended or adjusted under 35 U.S.C. 154(b) by 945 days.

(21) Appl. No.: 11/316,235

(22) Filed: Dec. 22, 2005

(65) Prior Publication Data

US 2007/0147848 A1    Jun. 28, 2007

(51) Int. Cl.
  *H04B 10/04* (2006.01)
  *H04J 4/00* (2006.01)
(52) U.S. Cl. ............. 398/193; 398/76; 398/182; 398/192; 398/194
(58) Field of Classification Search .......... 398/76, 398/182, 192, 194, 193; 725/129
  See application file for complete search history.

(56) References Cited

U.S. PATENT DOCUMENTS

| | | | | |
|---|---|---|---|---|
| 3,060,389 A * | 10/1962 | Kahn | ............ | 332/159 |
| 5,510,743 A | 4/1996 | Shi | ............ | 327/165 |
| 5,570,219 A * | 10/1996 | Shibutani et al. | ............ | 398/76 |
| 5,661,580 A | 8/1997 | Yamada | ............ | 359/126 |
| 5,680,238 A | 10/1997 | Masuda | ............ | 359/132 |
| 6,211,984 B1 | 4/2001 | Yoshida | ............ | 359/161 |
| 6,288,814 B1 * | 9/2001 | Blauvelt | ............ | 398/193 |
| 6,381,047 B1 | 4/2002 | Frigo et al. | ............ | 359/124 |
| 6,546,557 B1 | 4/2003 | Ovadia | ............ | 725/129 |
| 6,583,906 B1 | 6/2003 | Schemmann et al. | ............ | 359/161 |
| 6,587,257 B1 | 7/2003 | Davies | ............ | 359/328 |
| 6,728,277 B1 | 4/2004 | Wilson | ............ | 372/38.1 |
| 7,110,672 B2 * | 9/2006 | Fuse | ............ | 398/79 |
| 2002/0039388 A1 * | 4/2002 | Smart et al. | ............ | 375/260 |
| 2002/0064233 A1 | 5/2002 | Terreault et al. | ............ | 375/261 |
| 2002/0163705 A1 * | 11/2002 | Bakker et al. | ............ | 359/239 |
| 2003/0147655 A1 * | 8/2003 | Shattil | ............ | 398/182 |
| 2005/0246756 A1 | 11/2005 | Leddy et al. | ............ | 725/129 |

* cited by examiner

*Primary Examiner*—Ken N Vanderpuye
*Assistant Examiner*—Daniel G Dobson
(74) *Attorney, Agent, or Firm*—Larry T. Cullen

(57) ABSTRACT

A method and apparatus is provided for reducing clipping arising in an optical transmitter. The method begins by generating a frequency multiplexed sub-carrier signal onto which information is modulated at a plurality of different sub-carrier frequencies. The method continues by decorrelating in phase at least some pulses that are formed when two or more of the different sub-carrier frequencies are in phase with one another. An optical output produced by a laser is modulated in accordance with the frequency multiplexed sub-carrier signal after at least some of the pulses have been decorrelated in phase.

19 Claims, 6 Drawing Sheets

METHOD AND APPARATUS FOR REDUCING CLIPPING IN AN OPTICAL TRANSMITTER BY PHASE DECORRELATION

FIELD OF THE INVENTION

The present invention relates generally to optical transmitters used in broadband communications systems, and more particularly to a method and apparatus for reducing clipping that arises in such optical transmitters.

BACKGROUND OF THE INVENTION

In recent years, broadband network architectures for CATV networks have evolved from unidirectional analog systems to bi-directional, Hybrid Fiber Coaxial (HFC) systems with a mix of analog and digital signals. Such networks may deliver analog/digital video, analog/digital audio, and high speed data to cable subscribers. The most common configuration comprises a fiber optic main distribution network associated with a local distribution network using coaxial cable. For traditional broadcast TV service, most HFC CATV networks collect satellite and trunk cable feeds, local off-the-air television channels, and other video/audio channels and distribute them from the headend using an analog modulated signal scheme such as an amplitude modulated vestigial sideband (AM-VSB) scheme. The channels are placed onto different RF sub-carriers within a frequency spectrum allocated for CATV downstream transmission (typically 50 to 550 MHz), with each channel generally occupying 6 MHz of the spectrum. On the other hand, most new services being offered on CATV networks such as video-on-demand (VOD), digital TV, high-speed data (HSD), and IP telephony, are distributed using digital modulated RF sub-carriers. The digital modulated signals are typically multilevel quadrature amplitude modulated (M-QAM) sub-carriers within an RF band that is often between about 550-870 MHz. In the M-QAM scheme, both the amplitude and phase of the sub-carrier are varied to represent each digital symbol. For example, in a 256 QAM, 256 combinations of amplitude and phase are used. Finally, the M-QAM RF sub-carriers and the AM-VSB RF sub-carriers may be combined so that the resulting frequency multiplexed subcarrier signal may be used to modulate an optical carrier generated by a laser. This modulation and multiplexing scheme is sometimes referred to as a hybrid multichannel AM-VSB/M-QAM transport architecture.

When a number of frequency multiplexed subcarriers are simultaneously optically transmitted in a CATV network, the resulting modulated optical carrier signal may experience clipping distortion. The phenomena of clipping is illustrated in the graph of FIG. 1, which is a plot of a laser diode optical output L as a function of an the laser drive current I. FIG. 1 also shows a typical transfer characteristic (curve B) for the laser diode. The laser threshold point is also indicated on this plot. An applied RF input signal is impressed as shown on the laser drive current I. As shown, the swing of this drive signal is large enough to drive the laser below its threshold current, denoted as point "A" in FIG. 1. Driving the laser in this fashion results in the laser output being clipped, illustrated as region C. That is, the optical output signal of the laser diode exhibits clipped or flattened negative-going peaks in region C because of the transitions of the laser drive current below the threshold current.

Clipping can be a particular problem when analog subcarrier signals using vestigial sideband amplitude modulation (VSB-AM) are transmitted because it is generally important to set a high optical modulation index to ensure a large carrier-to-noise ratio (CNR). Because a large number of signals are being combined, occasional distortion of this type is almost inevitable. It may occur, for example, when multiple superimposed sub-carriers at different frequencies momentarily re-enforce each other to produce a drive current pulse that exhibits a relatively large displacement from the laser's bias current $I_{bias}$. When clipping does occur, the resulting momentary distortion caused by the pulse can greatly deteriorate the transmission quality (as measured in terms of the Bit Error Rate (BER), for example) of the digital subcarrier signal.

Another problem caused by clipping is that it effectively prevents the modulation index of the subcarrier signals from being increased to thereby increase the carrier to noise ratio (CNR) since such an increase would cause additional clipping to occur.

Various techniques are known for reducing clipping, particularly for directly modulated optical transmitters. For instance, pre-clipping, pre-distortion and dissymmetrization techniques may be employed. However, these techniques are difficult if not impossible to use with optical transmitters that are externally modulated.

SUMMARY OF THE INVENTION

A method and apparatus is provided for reducing clipping arising in an optical transmitter. The method begins by generating a frequency multiplexed sub-carrier signal onto which information is modulated at a plurality of different sub-carrier frequencies. The method continues by decorrelating in phase at least some pulses that are formed when two or more of the different sub-carrier frequencies are in phase with one another. An optical output produced by a laser is modulated in accordance with the frequency multiplexed sub-carrier signal after at least some of the pulses have been decorrelated in phase.

In one example, modulation is performed by direct modulation in which a bias current applied to the laser is modulated with the frequency multiplexed sub-carrier signal after at least some of the pulses have been decorrelated in phase.

In another example, modulation is performed by external modulation in which a continuous-wave optical output from the laser is modulated with the frequency multiplexed sub-carrier signal after at least some of the pulses have been decorrelated in phase.

In another example, the pulses that are decorrelated in frequency have an amplitude greater than a prescribed threshold value.

In yet another example, the decorrelated pulses are decorrelated in phase by an amount at least sufficient to reduce their amplitudes below the prescribed threshold value.

In another example, the frequency multiplexed sub-carrier signal comprise analog modulated sub-carrier signals.

In another example, the frequency multiplexed sub-carrier signal comprises analog and digital modulated sub-carrier signals.

In another example, only pulses arising from the analog modulated sub-carrier signals undergo phase decorrelation.

In another example, an optical transmitter arrangement is provided. The arrangement includes a laser and a sub-carrier signal source for providing a frequency multiplexed sub-carrier signal onto which information is modulated at a plurality of different sub-carrier frequencies. A pulse decorrelator is provided for spreading in frequency at least some pulses that are formed when two or more of the different sub-carrier frequencies are in phase with one another. The arrangement also includes a modulator for modulating an optical output of the laser in accordance with the frequency multiplexed sub-carrier signal after at least some of the pulses have been spread in frequency.

DETAILED DESCRIPTION

As detailed below, a method an apparatus is provided for reducing clipping in an optical transmitter that can be used in a broadband network architecture. While the method and apparatus may be employed with any optical transmitter, one example of a broadband network architecture in which the optical transmitter may be employed will be presented below for purposes of illustration.

Figure 2:
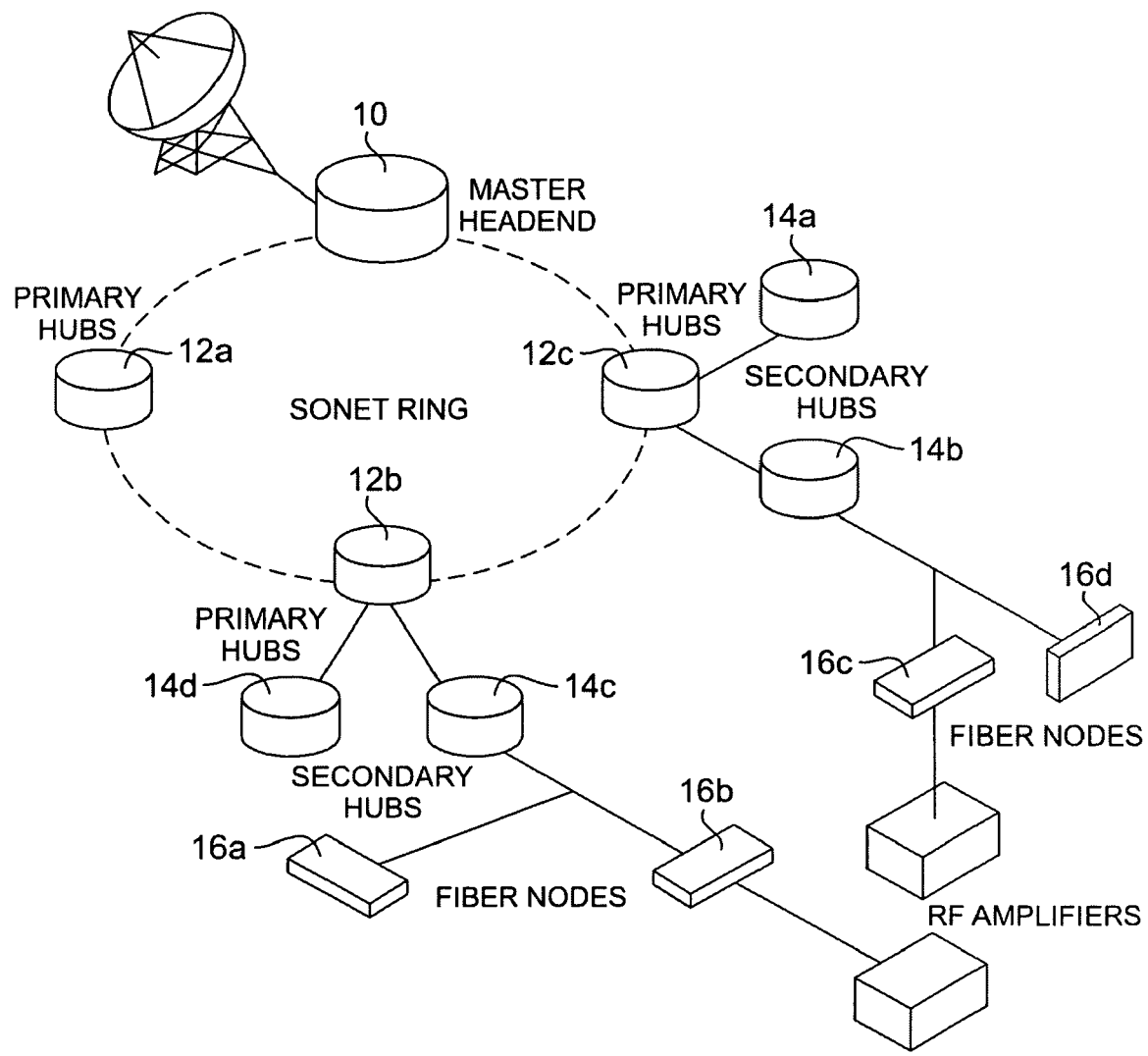
FIG. 2 is an example of a broadband HFC network architecture.

One common broadband network architecture that is commonly used in CATV networks is a HFC architecture, an example of which is shown in FIG. 2. As shown, the optical signals from the master headend 10 to the primary (12a, 12b and 12c) and the secondary (14a, 14b, 14c and 14d) hubs are transmitted over single-mode fiber (SMF) using, for example, 1550 nm externally modulated (EM) distributed feedback (DFB) laser transmitters. At the primary and secondary hubs, which may house Synchronous Optical Network (SONET) equipment as well as modems, routers, and servers for high-speed data, the optical signals may be converted to RF signals and then back to optical signals for transmission to various fiber nodes (16a, 16b, 16c and 16d) using, for example, 1310 nm DFB laser transmitters. The coaxial portion of the network architecture illustrated in FIG. 2 may include, for example, RF amplifiers, taps, and coaxial cables, and spans from each fiber node (16a-d) to the corresponding subscriber's home(s), where the digital set-top box is placed. Other broadband network architectures for use in CATV systems which are currently being developed and deployed, include, for example, Fiber-To-The-Curb (FTTC) architectures and Fiber-To-The Home (FTTH) architectures. As previously noted, the techniques described herein for reducing clipping are applicable to any such broadband network architectures and are not limited to the network shown in FIG. 2.

Figure 3:
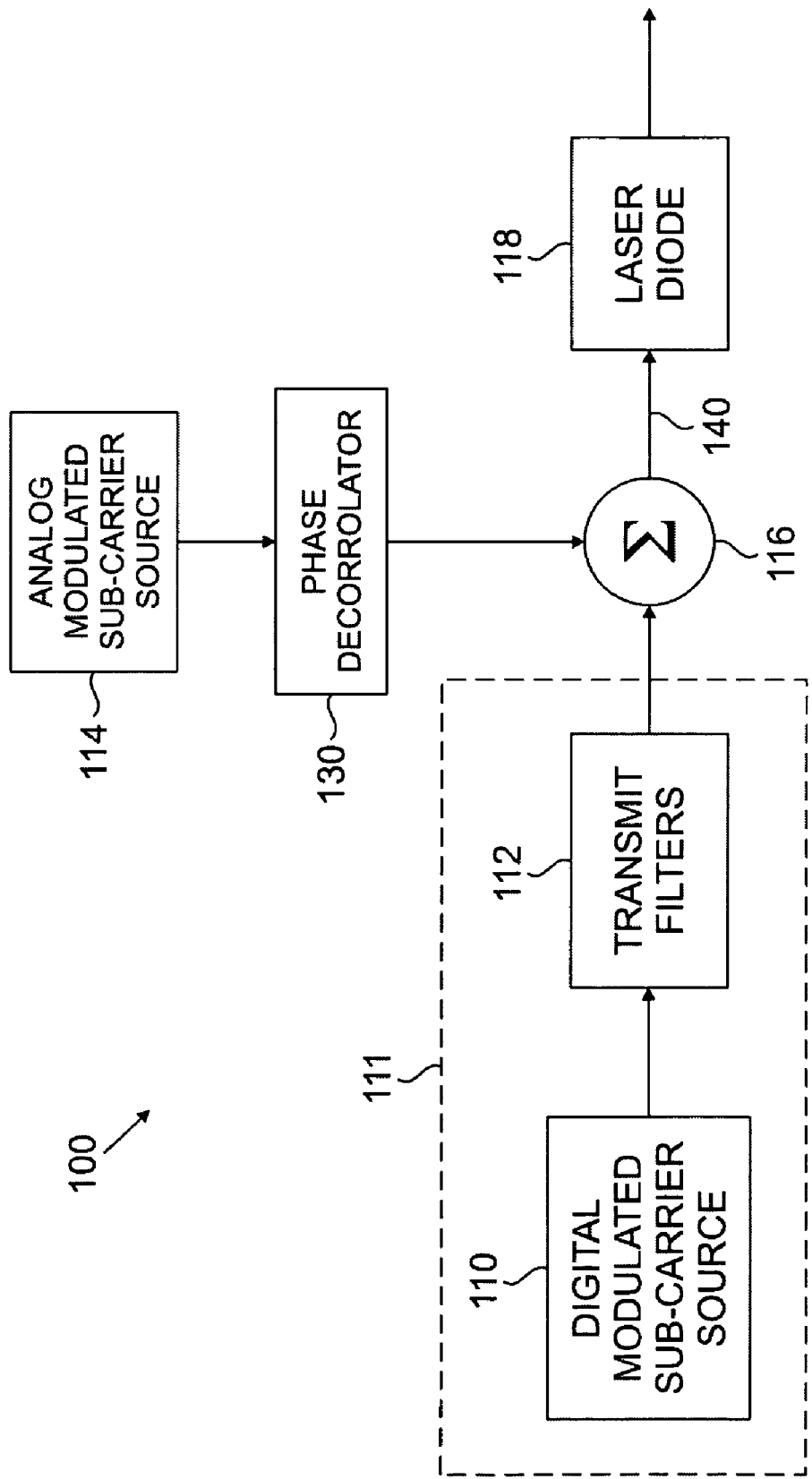
FIG. 3 is an example of an optical transmitter that may be employed in a broadband network architecture such as shown in FIG. 2.

FIG. 3 shows one example of an optical transmitter 100 that may be employed in the headend 10 or hubs 12 and 14 of the illustrative broadband network architecture shown in FIG. 2. In this example, in which a laser diode 118 undergoes direct modulation, the video signals include both vestigial sideband amplitude modulated signals (AM-VSB) that serve as analog sub-carriers provided by analog source 114 and digital signals such as multi-state quadrature amplitude modulated (M-QAM) sub-carriers. The digital sub-carriers, which are provided by a digital source 110, may be, for example, 16-QAM, 32-QAM or 256-QAM signals and may conform to the transmission standard adopted for high-definition television (HDTV) signals or to similarly encoded NTSC, PAL or SECAM signals. In this illustrative system, the analog sub-carriers are transmitted in the lower part of the signal spectrum (e.g., from about 50 to 550 MHz) while the M-QAM signals are transmitted in the higher end of the spectrum (e.g., from about 550 to 800 MHz).

The digital M-QAM sub-carriers are generated by circuitry 111 that includes both modulator 110, which place the baseband M-QAM channels onto the RF sub-carrier, and band-shaping filters 112, which reduce out-of-band components of the individual channels to reduce the possibility of interference among the channels. The digital M-QAM sub-carriers are summed with the AM-VSB sub-carriers in a summing circuit 116 such as a multiplexer to generate a frequency multiplexed sub-carrier signal 140. The frequency multiplexed sub-carrier signal 140 from the summing circuit 116 is a current that is used to directly modulate the laser diode 118. The laser diode 118 produces an optical output signal that varies in power in accordance with the modulating current. This optical signal may then be transmitted over an optical fiber employed in a broadband network such as shown in FIG. 2.

Figure 1:
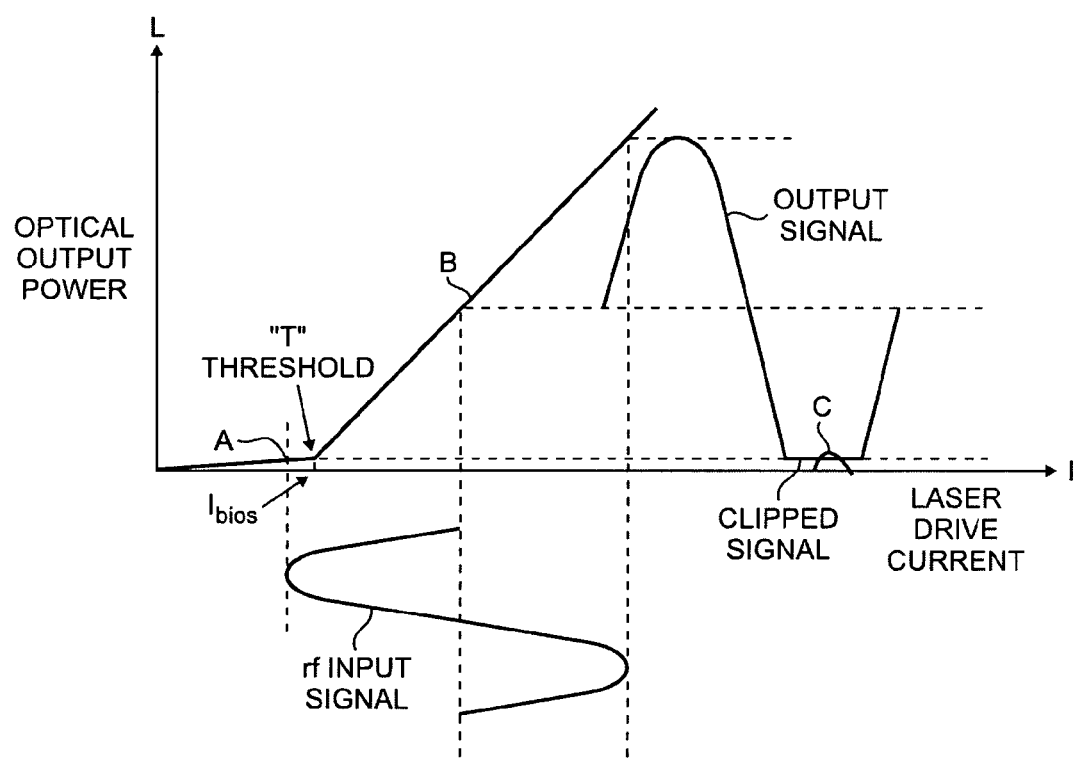
FIG. 1 is an illustrative plot of the optical output from a laser diode output as a function of laser drive current.
Figure 4:
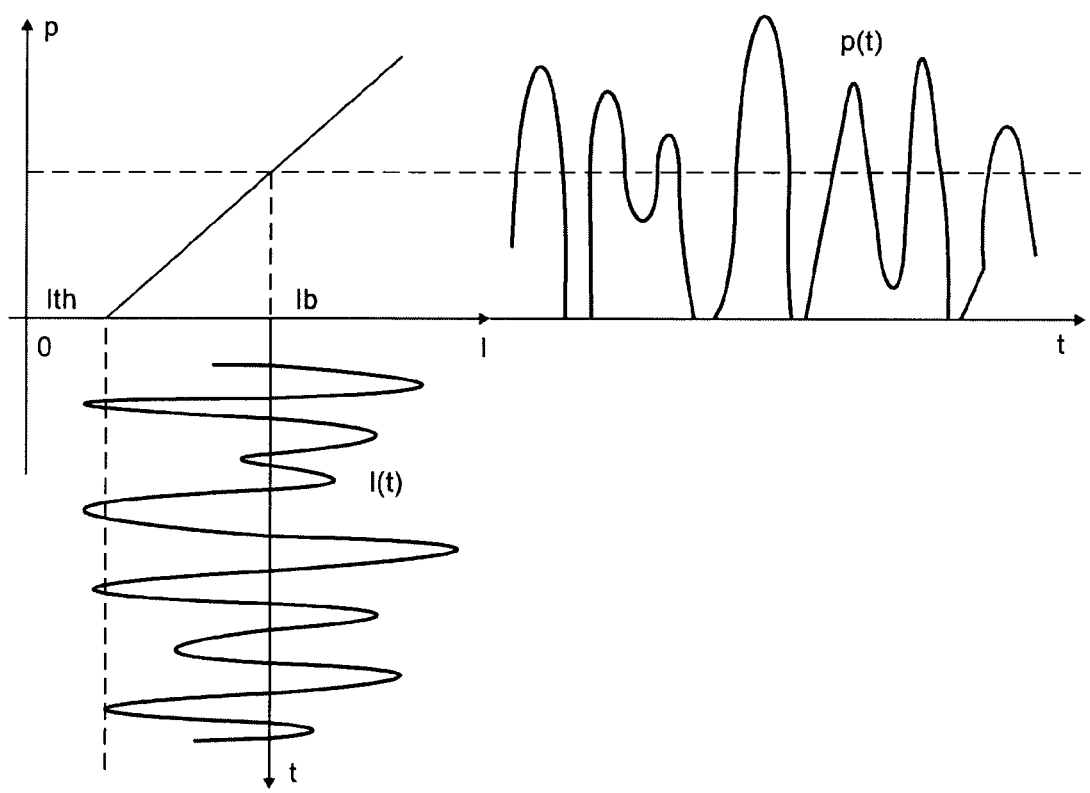
FIG. 4 is an illustrative plot of the optical output from a laser diode as a function of laser drive current showing the pulses that give rise to clipping.

As previously discussed in connection with FIG. 1, if at a given time some of the individual sub-carriers in the frequency multiplexed sub-carrier signal 140 modulating the laser drive current have the same phase, pulses will be produced. The amplitude of these pulses may be many orders of magnitude higher than the RMS amplitude of the frequency multiplexed sub-carrier signal 140. Due to their large amplitudes, the pulses may cause clipping of the optical output signal from the laser 118. This is illustrated in FIG. 4 for a multiplexed sub-carrier waveform I(t). As shown, the amplitude of I(t) is sometimes sufficiently great in magnitude to fall below the threshold current $I_{th}$ of the laser diode because of the formation of such pulses. Similar to what is shown in FIG. 1, when the amplitude of I(t) does fall below the threshold current, the optical output signal of the laser diode exhibits clipped or flattened negative-going peaks.

As mentioned above, the problems caused by clipping can be reduced by changing the phase relationship (decorrelation) of the frequency multiplexed sub-carrier signal components (i.e., channels) 140 when a pulse occurs. The phase change imposed on the signal components spreads the pulse in the time domain, reducing its large amplitude that would be clipped by the transmitter. The spreading of the pulses causes their amplitude to decrease so that overall the amplitude of the frequency multiplexed sub-carrier 140 signal remains above the threshold current of the laser diode, thereby avoiding clipping. As discussed in more detail below, the pulse spreading may be achieved with a pulse decorrelator such as phase decorrelator 130 shown in FIG. 3. In FIG. 3, the phase decorrelator 130 is located at the output of the analog source 114. While a pulse decorrelator may be employed to decorrelate pulses that arise in both the analog sub-carrier signal and the digital sub-carrier signal, it will generally be preferable to only decorrelate pulses that arise in the analog sub-carrier signal since the digital sub-carrier signal often uses a modulation technique such as M-QAM in which the digital symbols are represented by a constellation of different amplitudes and phases.

Figure 5:
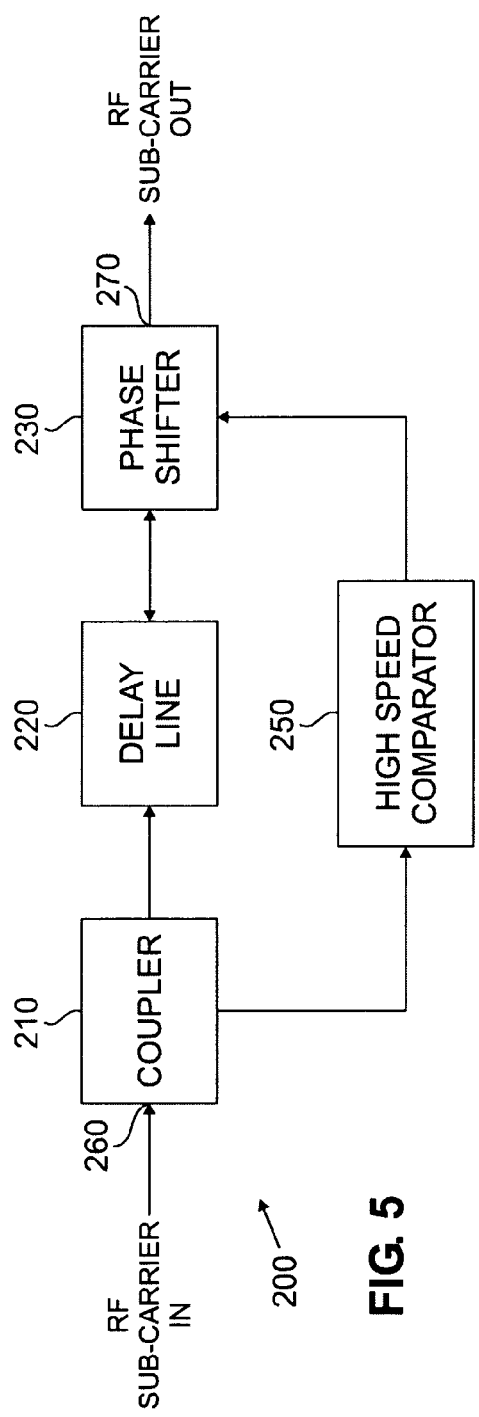
FIG. 5 is one example of a phase decorrelator that may be employed in the optical transmitter shown in FIG. 3.

FIG. 5 shows one example of a pulse decorrelator 200 that may serve as the phase decorrelator 130 in FIG. 3. The pulse decorrelator 200 includes an RF coupler 210, a delay line 220, a phase shifter 230, and a high-speed comparator 250. The RF coupler 210 is located at the input 260 of the pulse decorrelator 200 and serves to tap off a small portion (e.g., 20 dB) of the analog RF sub-carrier that it receives from the analog source 114 of the transmitter shown in FIG. 3. In some cases the coupler 210 may be an RF splitter, although generally it will not be necessary to tap such a large portion of the analog sub-carrier. The tapped off portion of the RF analog sub-carrier is directed to the high-speed comparator 250, which compares the instantaneous amplitude of the analog RF sub-carrier to a reference voltage. The comparator 250 generates an error signal whenever it detects a pulse that has an amplitude that exceeds the reference voltage. In response to the error signal, the phase shifter 230 spreads or decorrelates the pulse so that its instantaneous amplitude is reduced below the reference voltage. The output 270 from the phase shifter 230 is then directed to the summing circuit 116 in FIG. 3 before being applied to the laser diode 118. The reference voltage is selected so that the phase shifter 230 reduces the amplitude of those pulses exceeding the reference voltage. The amplitude of these pulses is reduced by an amount that is sufficient to prevent them from causing clipping. The delay line 220, which is located between the output of the coupler 210 and the input of the phase shifter 230, is used to synchronize the time at which the pulse reaches the phase shifter 230 and the time at which the phase shifter 230 is instructed by the comparator 250 to spread the pulse.

The phase shifter 230 should have a non-linear phase response in which the amount of the phase shift that is imparted varies with frequency across the bandwidth of the analog RF sub-carrier. In this way the frequencies over which the pulse extends will be increased, thereby causing the pulse to spread in frequency, which in turn will cause the amplitude of the pulse to decrease. The phase shifter 230 should have a non-linear phase response in which the amount of the phase shift that is imparted varies with frequency across the bandwidth of the analog RF sub-carrier. This is necessary since a linear phase shift of the frequency multiplexed sub-carrier signal components would just shift the pulse in time, and clipping would still happen. Ideally, the phase shifter should only impart a phase shift to the analog RF sub-carrier and little or no amplitude shift. That is, the reduction in amplitude of the pulse should arise largely from the spread in frequencies caused by the phase shift. One example of a phase shifter that may be employed in the pulse spreader 200 is an all-pass filter. All pass-filters are well known components that have an amplitude response that is constant over all frequencies and a phase response that varies with frequency. The particular non-linear phase response that is desired can be selected by suitably tailoring the transfer function of the all-pass filter in a well known manner. The non-linear phase response may be fixed or, alternatively, it may be dynamically adjusted depending on the amplitude of the particular pulse that is being spread. A dynamic phase shifter has the advantage that overcompensation can be avoided by ensuring that pulses are not spread any more than necessary to reduce or eliminate clipping.

The high speed comparator 250 employed in pulse decorrelator 200 may be any of a variety of commercially available comparators, provided that it has a sufficiently fast response time to compare the pulse's amplitude to the reference voltage. Such comparators are often based on an operational amplifier design. By way of example, if 83 channels spaced 6 MHz apart are employed over a bandwidth between about 55 MHz and 550 MHz, the pulse width will be on the order of 2 nanoseconds. Accordingly, a suitable comparator will have a response time less than about 1-2 nanoseconds. Thus, readily available comparators having response times on the order of a few hundred picoseconds will generally be suitable. Continuing with this example, the delay line 220 should impose a delay of about 100 picoseconds on the analog RF sub-carrier, which can generally be achieved with a free-space transmission line of about 30 cm or a transmission line formed in a typical PC board of about 5 cm (assuming a dielectric constant of about 4-5).

Figure 6:
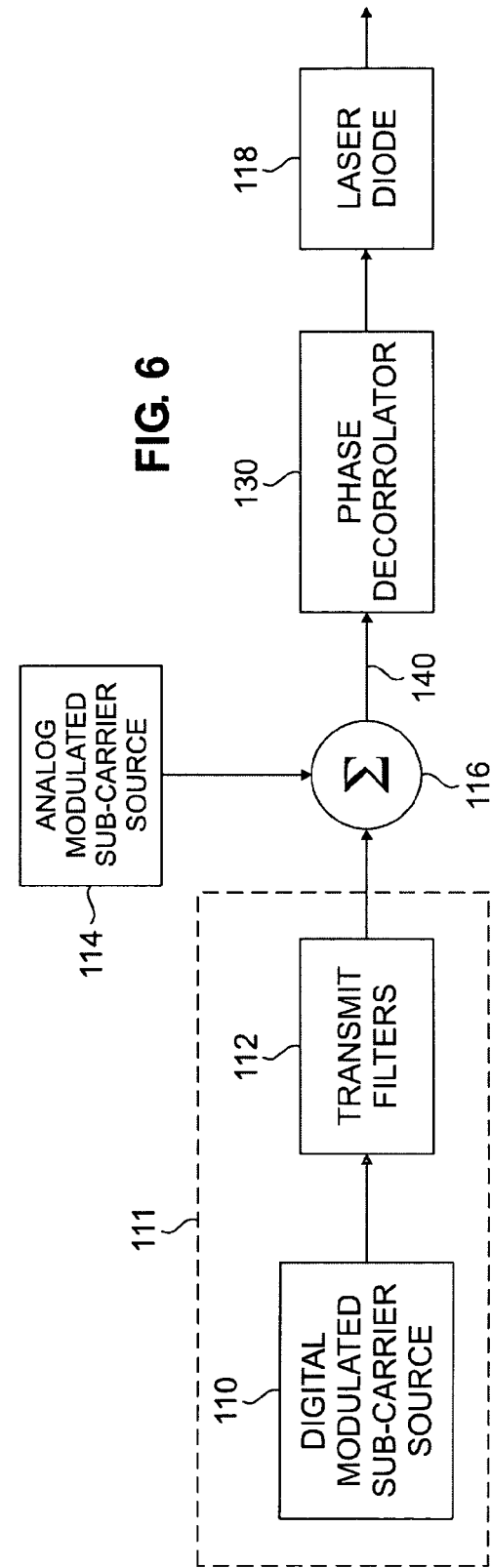
FIGS. 6 and 7 are other examples of optical transmitters that may be employed in a broadband network architecture such as shown in FIG. 2
Figure 7:
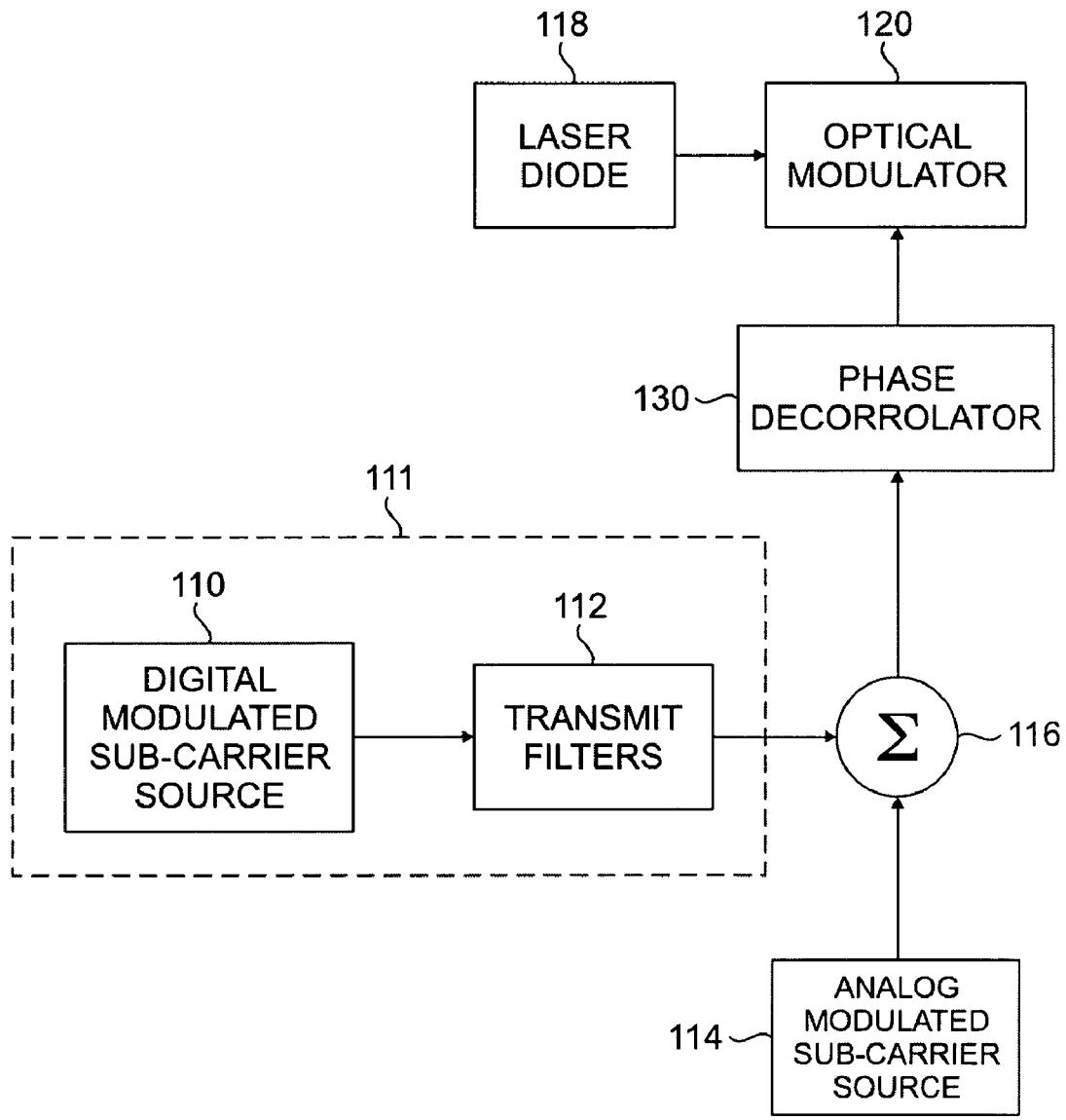

FIG. 6 shows another example of a transmitter in which the phase decorrelator 130 is located at the output of the summing element 116 instead of at the analog sub-carrier input to the summing element, as shown in FIG. 3. In FIGS. 3 and 6, as well as FIG. 7 presented below, like reference numerals are used to denote like elements. In this example the phase shift may be applied to both the analog sub-carriers produced by analog source 114 as well as the digital sub-carriers produced by the digital source 110. As previously mentioned, however, it will generally be desirable to only impart a phase shift to the analog sub-carriers to avoid degradation of the digital sub-carriers' BER. This can be accomplished by only activating the phase shifter 230 when a phase shift is to be applied to the analog portion of the frequency multiplexed sub-carrier signal and deactivating the phase shifter 230 when it is would otherwise be imparting a phase shift to the digital portion of the frequency multiplexed sub-carrier signal. The phase shifter 230 may be activated and deactivated in this manner by incorporating into the phase shifter a switch that may be formed from something as simple as a Schottky diode FIG. 7 shows another example of an optical transmitter that may incorporate a pulse decorrelator of the type discussed above. In contrast to the optical transmitter shown in FIG. 3 in which a direct modulation scheme is used, in FIG. 7 an external modulation scheme is employed to modulate a continuous-wave laser diode 118. As shown, an optical modulator 120 is located at the output of the laser 118. The optical modulator 120 optically modulates the output from the laser 118 in accordance with the frequency multiplexed sub-carrier signal provided by analog source 114 and digital source 110. One distinction between an external modulation scheme and a direct modulation scheme is that the optical modulator 120 is generally modulated using a voltage, whereas a current is used to modulate the transmitter in a direct modulation scheme. In the external modulation arrangement, the phase decorrelator 130 decorrelates pulses that would otherwise cause clipping in the manner described above.

The transfer function of an externally modulated transmitter is different from the transfer function of a direct modulation transmitter such as shown in FIG. 1. In particular, the external modulator that is employed is often a Mach-Zehnder modulator, which exhibits a largely sinusoidal transfer function. As a result, in an externally modulated arrangement, clipping may arise from both positive-going amplitude fluctuations as well as negative-going amplitude fluctuations (note that in FIG. 1 only negative-going amplitude fluctuations give rise to clipping and thus in a direct modulator transmitter only the negative-going pulses need to be spread). Accordingly, in the case of an externally modulator transmitter, both the positive and negative-going pulse amplitudes should not exceed the reference voltage used by the comparator 250 to trigger the phase shifter 230. The reference voltages that are employed may be the same or different for the positive and negative-going pulse amplitudes. Alternatively, a reference voltage window may be established, which when exceeded, will trigger the phase shifter 230.

A method and apparatus has been described for reducing clipping in an optical transmitter that can be used in a broadband network architecture. In contrast to previous techniques, the technique described herein is readily applicable to externally modulated lasers as well as directly modulated lasers.

The invention claimed is:

1. A method for reducing clipping arising in an optical transmitter, comprising:
generating a frequency multiplexed sub-carrier signal onto which information is modulated at a plurality of different sub-carrier frequencies;
decorrelating in phase at least some pulses that are formed when two or more of the different sub-carrier frequencies are in phase with one another; and
modulating an optical output produced by a laser in accordance with the frequency multiplexed sub-carrier signal after at least some of the pulses have been decorrelated in phase.

2. The method of claim 1 wherein the modulating is performed by direct modulation in which a bias current applied to the laser is modulated with the frequency multiplexed sub-carrier signal after at least some of the pulses have been decorrelated in phase.

3. The method of claim 1 wherein the modulating is performed by external modulation in which a continuous-wave optical output from the laser is modulated with the frequency multiplexed sub-carrier signal after at least some of the pulses have been decorrelated in phase.

4. The method of claim 1 wherein the pulses that are decorrelated in frequency have an amplitude greater than a prescribed threshold value.

5. The method of claim 4 wherein the decorrelated pulses are decorrelated in phase by an amount at least sufficient to reduce their amplitudes below the prescribed threshold value.

6. The method of claim 1 wherein the frequency multiplexed sub-carrier signal comprise analog modulated sub-carrier signals.

7. The method of claim 1 wherein the frequency multiplexed sub-carrier signal comprises analog and digital modulated sub-carrier signals.

8. The method of claim 7 wherein only pulses arising from the analog modulated sub-carrier signals undergo phase decorrelation.

9. The method of claim 7 wherein the analog modulated sub-carrier signals are located in a continuous frequency band separate from a continuous frequency band in which the digital modulated sub-carrier signals are located.

10. An optical transmitter arrangement, comprising:
a laser;
a sub-carrier signal source for providing a frequency multiplexed sub-carrier signal onto which information is modulated at a plurality of different sub-carrier frequencies;
a pulse decorrelator for spreading in frequency at least some pulses that are formed when two or more of the different sub-carrier frequencies are in phase with one another; and
a modulator for modulating an optical output of the laser in accordance with the frequency multiplexed sub-carrier signal after at least some of the pulses have been spread in frequency.

11. The optical transmitter arrangement of claim 10 wherein the pulse decorrelator imparts a phase shift across a frequency bandwidth occupied by the pulses being spread.

12. The optical transmitter arrangement of claim 11 wherein the pulse decorrelator comprises an all-pass filter having a transfer function that gives rise to the phase shift.

13. The optical transmitter arrangement of claim 10 wherein the pulse decorrelator further comprises a comparator for comparing pulse amplitudes to a reference voltage, and wherein the pulses that are spread in frequency have amplitudes greater than the reference voltage.

14. The optical transmitter arrangement of claim 12 wherein the pulse decorrelator further comprises a comparator for comparing pulse amplitudes to a reference voltage, and wherein the pulses that are spread in frequency have amplitudes greater than the reference voltage.

15. The optical transmitter arrangement of claim 14 wherein the pulse decorrelator further comprises a coupler an input for receiving the frequency multiplexed sub-carrier signal from the signal source and a first output for directing a portion of the frequency multiplexed sub-carrier signal to the comparator.

16. The optical transmitter arrangement of claim 15 further comprising a delay line coupling a second output of the coupler to an input of the all-pass filter for temporally synchronizing a time at which the frequency multiplexed sub-carrier signal is applied to the all-pass filter and a time at which the all-pass filter receives a signal from the comparator directing the all-pass filter to spread in frequency those pulses having an amplitude greater than the reference voltage.

17. The optical transmitter arrangement of claim 10 wherein the frequency multiplexed sub-carrier signal comprises analog modulated sub-carrier signals.

18. The optical transmitter arrangement of claim 10 wherein the frequency multiplexed sub-carrier signal comprises analog and digital modulated sub-carrier signals.

19. The optical transmitter arrangement of claim 18 wherein the pulse decorrelator is configured to only impart a spread in frequency to pulses arising from the analog modulated sub-carrier signals.

* * * * *